United States Patent
Xing et al.

(10) Patent No.: US 10,287,214 B2
(45) Date of Patent: May 14, 2019

(54) PREPARATION METHOD OF SIC POROUS CERAMIC MATERIAL AND POROUS CERAMIC MATERIAL MANUFACTURED BY USING SAME

(71) Applicant: NANJING TECH UNIVERSITY, Nanjing (CN)

(72) Inventors: Weihong Xing, Nanjing (CN); Zhaoxiang Zhong, Nanjing (CN); Feng Han, Nanjing (CN); Feng Zhang, Nanjing (CN); Nanping Xu, Nanjing (CN)

(73) Assignee: NANJING TECH UNIVERSITY, Nanjing (CN)

( * ) Notice: Subject to any disclaimer, the term of this patent is extended or adjusted under 35 U.S.C. 154(b) by 100 days.

(21) Appl. No.: 15/509,825

(22) PCT Filed: Sep. 9, 2014

(86) PCT No.: PCT/CN2014/086146
§ 371 (c)(1),
(2) Date: Mar. 8, 2017

(87) PCT Pub. No.: WO2016/037316
PCT Pub. Date: Mar. 17, 2016

(65) Prior Publication Data
US 2017/0283329 A1    Oct. 5, 2017

(51) Int. Cl.
*C04B 35/565* (2006.01)
*C04B 35/634* (2006.01)
(Continued)

(52) U.S. Cl.
CPC .......... *C04B 35/806* (2013.01); *C04B 35/565* (2013.01); *C04B 35/62615* (2013.01);
(Continued)

(58) Field of Classification Search
CPC .......... C04B 35/565; C04B 2235/5244; C04B 35/63416; C04B 38/068; C04B 2235/3244; C04B 38/0006
See application file for complete search history.

(56) References Cited

U.S. PATENT DOCUMENTS

| | | | | |
|---|---|---|---|---|
| 5,342,563 A | * | 8/1994 | Quinn | C04B 35/111 264/681 |
| 2003/0044593 A1 | * | 3/2003 | Vaidyanathan | B29B 15/122 428/297.4 |
| 2011/0151181 A1 | * | 6/2011 | Liu | C04B 35/195 428/116 |

FOREIGN PATENT DOCUMENTS

| CN | 102161594 | | 8/2011 |
|---|---|---|---|
| CN | 103253935 A | * | 8/2013 |

(Continued)

OTHER PUBLICATIONS

CN 103253935 A (Ciu) Aug. 21, 2013 (English language machine translation). [online] [retrieved Oct. 3, 2018]. Retrieved from: Espacenet. (Year: 2013).*

(Continued)

*Primary Examiner* — Erin Snelting
(74) *Attorney, Agent, or Firm* — Treasure IP Group, LLC

(57) ABSTRACT

A preparation method of a SiC porous ceramic material and porous ceramic material manufactured by using the method, comprising: mixing a SiC aggregate, a sintering aid (zirconium oxide), a pore-forming agent (activated carbon) and a polymer binder with a reinforcing agent (SiC whiskers) according to a certain proportion, and obtaining a porous ceramic material via forming, drying and high-temperature sintering. The porous ceramic material has a high strength, a high porosity, a good thermal shock resistance and a low (Continued)

sintering temperature, and can server as a filter material of high-temperature flue gas and a carrier material in vehicle exhaust purification.

6 Claims, 6 Drawing Sheets

(51) Int. Cl.
 C04B 38/06 (2006.01)
 C04B 38/00 (2006.01)
 C04B 35/80 (2006.01)
 C04B 35/63 (2006.01)
 C04B 35/632 (2006.01)
 C04B 35/64 (2006.01)
 C04B 35/626 (2006.01)

(52) U.S. Cl.
 CPC ...... *C04B 35/62685* (2013.01); *C04B 35/632* (2013.01); *C04B 35/6303* (2013.01); *C04B 35/63416* (2013.01); *C04B 35/64* (2013.01); *C04B 38/0003* (2013.01); *C04B 38/0006* (2013.01); *C04B 38/067* (2013.01); *C04B 38/068* (2013.01); *C04B 2235/3244* (2013.01); *C04B 2235/3826* (2013.01); *C04B 2235/422* (2013.01); *C04B 2235/5244* (2013.01); *C04B 2235/5276* (2013.01); *C04B 2235/5427* (2013.01); *C04B 2235/5436* (2013.01); *C04B 2235/6021* (2013.01); *C04B 2235/6562* (2013.01)

(56) References Cited

FOREIGN PATENT DOCUMENTS

| | | |
|---|---|---|
| CN | 103833403 | 6/2014 |
| CN | 104211422 | 12/2014 |
| JP | 61291460 S | 12/1986 |

OTHER PUBLICATIONS

Li, Shuang "Preparation and characterization of reaction bonded silicon carbide reinforced bu random chopped fiber" Chinese Doctoral Dissertations Full-text Database Engineering Science and Technology I, No. 01, Jan. 15, 2014 (Jan. 15, 2014), ISSN: ISSN 1674-022X, pp. 21-23, sections 2.1 and 2.2.

* cited by examiner

… (1)

PREPARATION METHOD OF SIC POROUS CERAMIC MATERIAL AND POROUS CERAMIC MATERIAL MANUFACTURED BY USING SAME

CROSS REFERENCE TO RELATED APPLICATION

This application is a national stage application of a PCT application PCT/CN2014/086146, Sep. 9, 2014, entitled "PREPARATION METHOD OF SIC POROUS CERAMIC MATERIAL AND POROUS CERAMIC MATERIAL MANUFACTURED BY USING SAME." The international application is incorporated herein by reference in its entirety.

TECHNICAL FIELD

The invention relates to a SiC porous ceramic material, its preparation method and its application in high-temperature flue gas purification and belongs to the porous ceramic material technology field.

BACKGROUND TECHNOLOGY

Because of its low density as well as excellent corrosion resistance, high-temperature resistance, high-temperature oxidation resistance and thermal shock resistance, porous SiC ceramic material can be widely used in molten metal filters, catalyst carriers, water purifiers, thermal insulation and sound absorbing materials, gas combustion chamber media and high-temperature gas filters.

The preparation of high-strength porous SiC ceramic material generally requires a very high sintering temperature, usually above 1,800° C. The production process of such material can cause high energy consumption. Reducing the sintering temperature has been a research focus. Currently, there are two widely used low-temperature sintering technologies: one is to add inorganic metal oxides to react with SiC aggregate to form a new phase to strengthen the neck link of the particles, thereby enhancing the strength of SiC ceramic material; the other is to use polycarbonate silane as the precursor to prepare porous SiC ceramics at lower temperatures, but this method is costly and is difficult to produce and use on a large scale. Zircon is a chemically inert substance and has a strong corrosion resistance, and it is also difficult to react with molten metal and has a high stability in the high-temperature exhaust gas. Because zircon and SiC have very close thermal expansion coefficient, they can be well combined and have excellent high-temperature thermal shock resistance and is one of high-temperature dustproof ceramic materials with broad application prospects. However, there are many problems in the preparation of zircon-SiC porous ceramics. For example, porous ceramics prepared with SiC having a small particle size and the pore-forming agent have insufficient pore connectivity, small pore size and other defects, resulting in low gas permeability. This can't meet the high gas permeability required for high-temperature gas filtration and dust removal. Zircon is usually formed by letting zirconia and SiC react in the aerobic atmosphere. If SiC aggregate having a size of more than 100 microns is used to make zircon ceramics, a problem will also occur, that is, only a small part of the surface of SiC particles can be exposed to air, so the SiC particles can't be completely oxidized and a little zircon can form only in the neck surface of the particles. The porous ceramic prepared this way has very small strength and can't meet the needs of industrial production and can't be used as a high-temperature gas dust removal material. SiC whiskers have excellent mechanical properties, heat resistance, corrosion resistance and high-temperature oxidation resistance and have become one of the main reinforcing agents for a variety of high-performance composite materials.

For example, the Chinese patent application file (Publication No. CN102161594A) discloses a SiC whiskers-reinforced SiC ceramic matrix composite material, whose highest flexural strength was found to reach up to 500 MPa. The composite material has excellent comprehensive properties. Another example is that the Chinese patent application file (Publication No. CN100545127C) discloses a SiC whiskers-toughened titanium carbonitride-based cermet cutting blade which has high strength, high toughness and better abrasion resistance and heat resistance. However, the above patents are all related to the field of functional ceramics, and there are few studies on the use of SiC whiskers to reinforce the porous ceramic materials. In particular, there have not yet been published studies about the use of SiC whiskers for the preparation of SiC porous ceramic materials.

For porous SiC ceramic materials used for high-temperature flue gas purification, the flexural strength, porosity and average pore size are very important indicators, because the strength can withstand the impact of airflow, thus extending the service life of the materials; porosity and the average pore size mean a higher gas flux. In the existing technologies, large particles of SiC are difficult to oxidize, resulting in a small amount of zircon produced, so the flexural strength of the resulted ceramic material is not high, making it difficult to realize large-scale applications. Therefore, it is of great significance to use SiC whiskers to reinforce porous SiC materials to meet the requirements of high-temperature flue gas purification.

The purpose of the invention is to improve the strength and porosity of SiC porous ceramics at the same time to obtain a type of SiC porous ceramic material for high-temperature filtration.

The inventors of the invention have found that the addition of certain SiC whiskers into the mixture using SiC as aggregate can significantly improve the flexural strength of SiC porous ceramics, and the finally obtained SiC porous ceramics still have high porosity and good heat shock resistance and can meet the application requirements.

In order to achieve the above objective, the technical scheme used by the invention is:

A method for preparing a type of whisker-reinforced SiC porous ceramic material was proposed. Raw materials for preparing such material include large-particle SiC aggregate, a sintering aid, a pore-forming agent, and a type of macromolecular polymer for bonding, and another type of macromolecular polymer used for reducing the mold-release resistance. The feature of the method lies in that the blending materials also include a type of reinforcing agent, that is, SiC whiskers.

The method described in the invention is characterized by that the said sintering aid is zirconia, the said pore-forming agent is activated carbon, the said macromolecular polymer for bonding is polyvinyl alcohol (PVA), and the said macromolecular polymer used for reducing the mold-release resistance is liquid paraffin.

The method described in the invention is characterized by that the steps of preparing SiC porous ceramic material are:
(1) SiC aggregate, zirconia, activated carbon and SiC whiskers are mixed and then mechanically ground via ball milling to obtain a mixed powder a;
(2) Add PVA and liquid paraffin into the mixed powder a and mix them evenly, and then make the mixture into SiC porous ceramic green body through the dry pressing or extrusion method, and then dry the green body in the oven to get green body b;

(3) Green body b is placed in a high-temperature furnace to sinter. After natural cooling, a type of porous ceramic material can be obtained.

The method described in the invention is characterized by that the milling time in step (1) is 2-10 h until powder a is mixed evenly.

The method described in the invention is characterized by that the drying temperature of step (2) is 60 to 90° C. and the drying time is 2 to 4 hours.

The method described in the invention is characterized by that the sintering process mentioned in step (3) uses the following steps: first raise the temperature to 200° C. at a rate of 1-2° C./min; then raise the temperature to 500° C. at a rate of 2-3° C./min; keep the temperature at 500° C. for 0.5~1 h to remove the activated carbon; finally raise the temperature to 1,450~1,650° C. at a rate of 3~3.5° C./min and keep the temperature at the point for 2~6 h.

The method described in the invention is characterized by that the shapes of the said green bodies include plate, tube and honeycomb.

The method described in the invention is characterized by that the said SiC aggregate has an average particle size of 20-300 μm; the said $ZrO_2$ has an average particle size of 1-5 μm and a purity of more than 99%; the said SiC whiskers have a crystal form of β and L/D>20, wherein L is a length of a SiC whisker and D is a diameter of the SiC whisker; the said activated carbon has a particle size of 8-50 μm; the said PVA is 1-10% PVA aqueous solution; and the ratio (mass ratio) of the said mixture is: zirconia occupies 5-20%, SiC whiskers 1-10%, activated carbon 5-15%, PVA 5%, and the remaining is SiC aggregate.

The method described in the invention is characterized by that a type of porous ceramic membrane material is obtained according to the method.

The method described in the invention is characterized by that the resulted porous ceramic membrane material is applied in the high-temperature flue gas dust removal and vehicle exhaust purification. The principle of the method described in the invention is as follows: the porous structure is obtained by the accumulation of particles and the addition of the pore-forming agent; the sintering aid is added into the mixture to enhance the bonding between the particles by means of the reactive sintering technology; for the problem that large SiC particles are difficult to oxidize at high temperature and this results in the too low strength of the prepared ceramic sample, SiC whiskers are added into the mixture to react with $ZrO_2$ to produce zircon to reinforce the neck connection among SiC particles, thereby enhancing the ceramic strength.

The main content of the invention is to prepare a type of whisker-reinforced SiC porous ceramics, a type of zircon-SiC porous ceramics having a high flexural strength, and to use it in high-temperature flue gas filtration, especially in large thermal power plants, steel plants and other industries where coal is massively consumed.

In the invention, various parameters are determined with the following methods:

1. The porosity is tested with the Archimedes principle, with deionized water as the soaking medium. For the specific steps, please refer to relevant literature (reference: *Physical Testing and Chemical Analysis-Part A: Physical Testing: Methods for determining the density and porosity of ceramic materials*. (2006): 42(6): 289-291).

2. The flexural strength is tested with the flexural strength tester to measure the average flexural strength value of three points, with a span of 40 mm and a loading speed of 0.5 mm/min. As for the specific test steps, please refer to the national standard GB/T1965-1996 (reference: the national standard of the People's Republic of China: *Test method for the flexural strength of porous ceramics* (GB/T1965-1996), released on Sep. 13, 1996 and implemented on Apr. 1, 1997).

3. The pore size is tested with the gas bubble pressure method, with deionized water as the wetting agent. As for the specific test steps, refer to the relevant literature (reference: *Inorganic Membrane Separation Technology and Application*, by Xu Nanping, Xing Weihong and Zhao Yijiang, Chemical Industry Press, 2003, 21-22).

4. The test method of the gas permeation performance is to test the gas flow at the infiltration side under different pressures, using a gas-solid separation device made by the lab (reference: *Preparation and Characterization of Porous Materials*, by Chen Yong, China University of Science and Technology Press, 2010, 249-250).

In comparison with the existing preparation techniques, the zircon-SiC porous ceramics prepared in the invention has the following positive effects:

(1) Improve the strength of porous ceramics to ensure its application in the actual process.

(2) Provide a method for the preparation of high-strength porous ceramics, and provide an idea for the preparation of other porous ceramic materials.

(3) Prepare high-porosity new-type SiC porous ceramic materials, improve their gas permeability and expand their practical applications.

SPECIFIC IMPLEMENTATION CASES

Implementation Case 1

This implementation case illustrates a type of SiC porous ceramic material and its preparation method as well as the preparation effect without adding SiC whiskers as a contrast.

SiC aggregate, zirconia, SiC whiskers and activated carbon are mixed together and then ball milled for 2~10 h. After being mixed evenly, the mixed powder is poured into the mortar. While the mixture is being mixed, an appropriate amount of PVA and liquid paraffin are added into it. Then, the mixture is made into ceramic green bodies having a number of different shapes through the dry pressing or extrusion method, and the green bodies are then dried in the 60-90° C. oven for 4-6 h and finally placed into a muffle furnace to be sintered at 1,450° C.~1,650° C. for 2~6 h to get a type of SiC porous ceramic sample.

In the implementation case of the contrast preparation effect, no SiC whiskers are added, but the other conditions are the same.

The chemical reagents used are listed in the following table:

TABLE 1

Chemical reagents

| Raw Material | Purity Category |
|---|---|
| Silicon carbide | AR |
| SiC whisker | AR |
| Zirconia | AR |
| Activated carbon | CP |
| Polyvinyl Alcohol | AR |
| Liquid paraffine | AR |

The characterization results of the prepared materials are shown in the following table:

TABLE 2

Comparison of characterization results of materials

| Sample | Porosity (%) | Bending strength (MPa) | Mean pore diameter (μm) | Gas permeability ($m^3/m^2 \cdot h \cdot bar$) |
|---|---|---|---|---|
| With SiC whisker | 51 | 26 | 13 | 24000 |
| Without SiC whisker | 47 | 10 | 8 | 12000 |

The above results show that when the sintering temperature is 1,550° C. and the temperature keeping time is 4 h, the porosity of SiC porous ceramics containing SiC whiskers decreases by 44% compared with that of the SiC porous ceramics containing no SiC whiskers, but the flexural strength of the former is 2.6 times higher than that of the latter, reaching 26 MPa, and the pore size and gas permeability of the former are also improved, so the addition of SiC fiber can indeed improve the flexural strength of SiC porous ceramic matrix.

Figure 1:
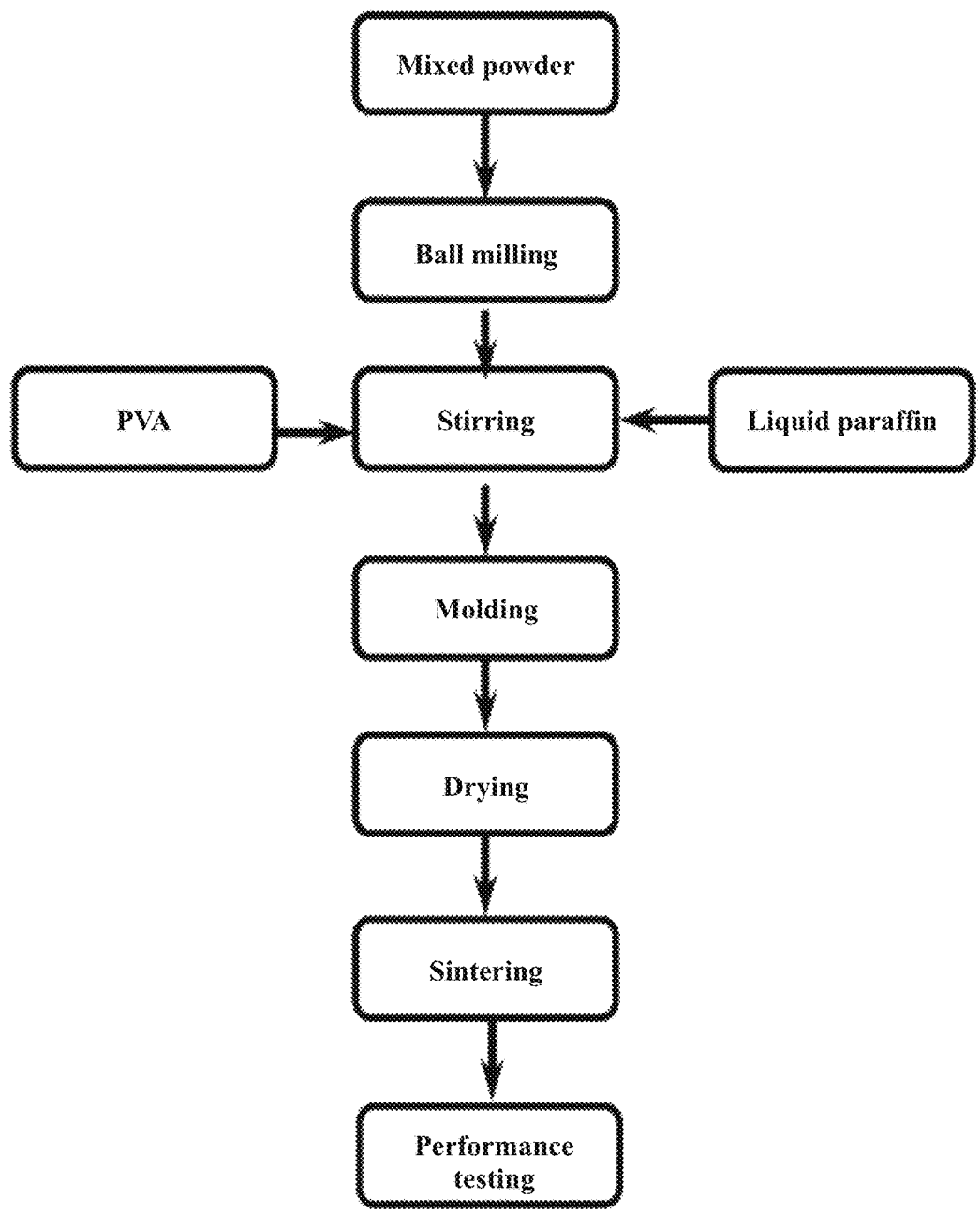
FIG. 1 is the flow chart for the preparation of SiC whisker-reinforced SiC porous ceramics.

FIG. 1 is the flow chart for the preparation of SiC whisker-reinforced SiC porous ceramics in Implementation Case 1.

Figure 2:
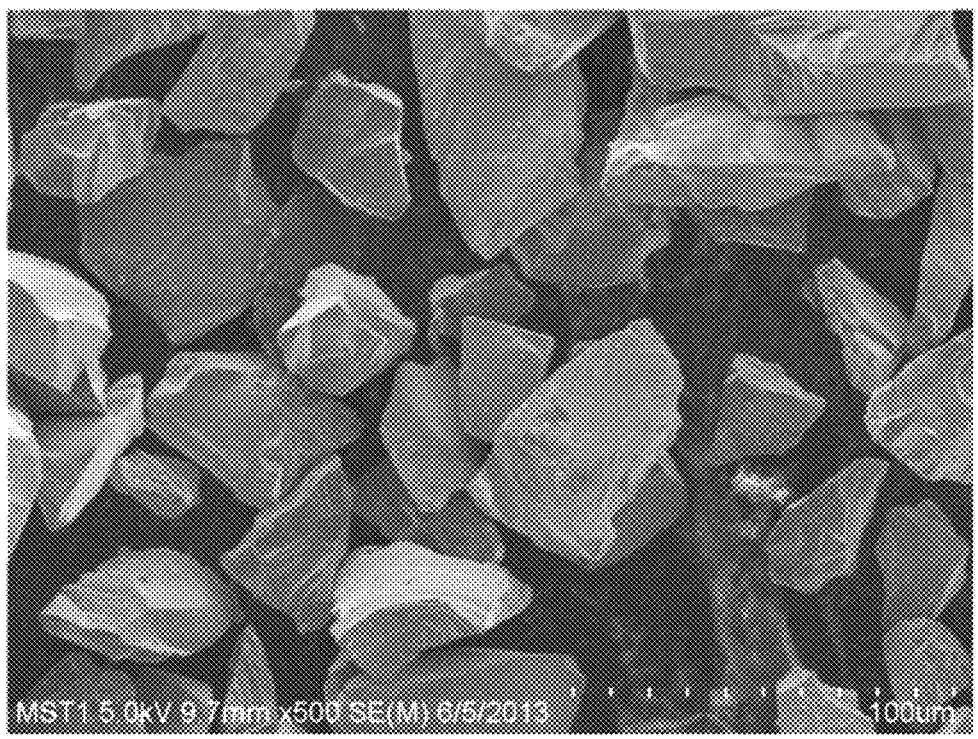
FIG. 2 shows the micrographs of the SiC particles (100 μm) (FIG. 2A) and SiC whiskers (L/D>20) (FIG. 2B), which are both the raw materials used for the preparation of porous ceramics in Implementation Case 1.
Figure 2:
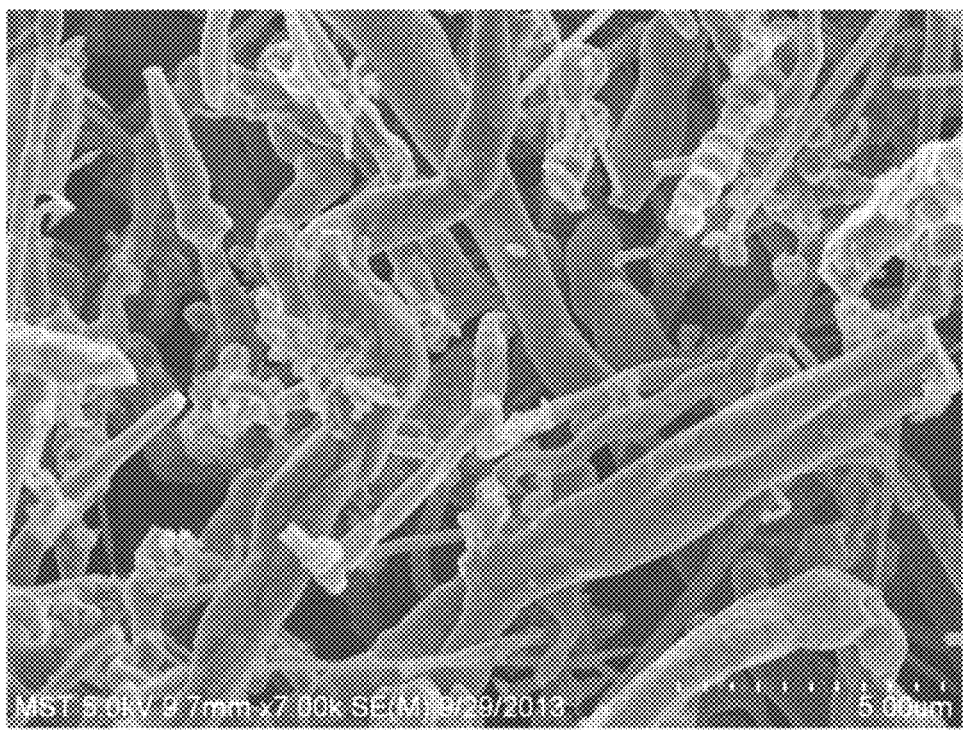

FIG. 2 shows the micrographs of the SiC particles (100 μm) (FIG. 2A) and SiC whiskers (L/D>20) (FIG. 2B), which are both the raw materials used for the preparation of porous ceramics in Implementation Case 1.

Figure 3:
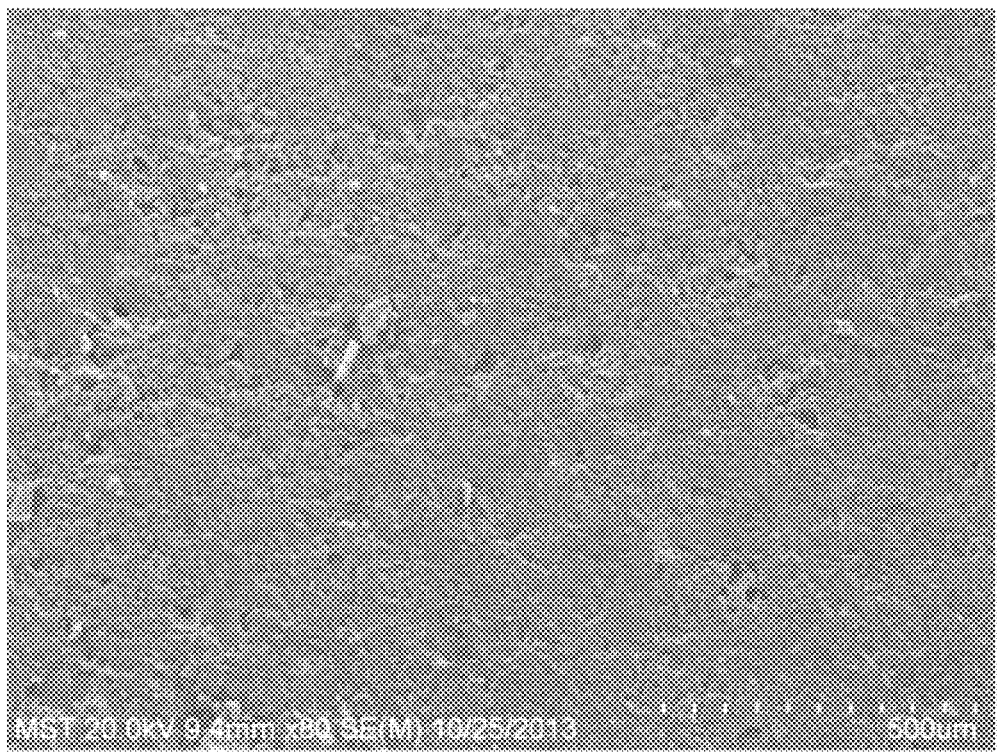
FIG. 3 shows the micrographs of the raw billet obtained in Implementation Case 1 (FIG. 3A) as well as the sintered samples without the addition of whiskers (FIG. 3B) and with the addition of 3.3% whiskers (FIG. 3C) in Implementation Case 11.
Figure 3:
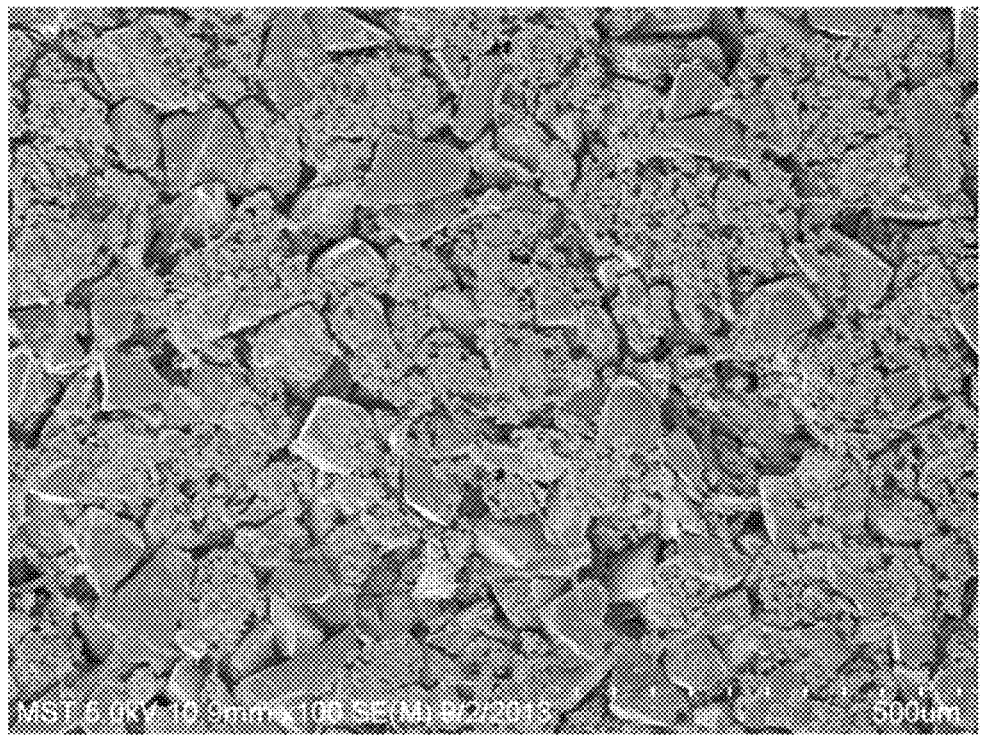
Figure 3:
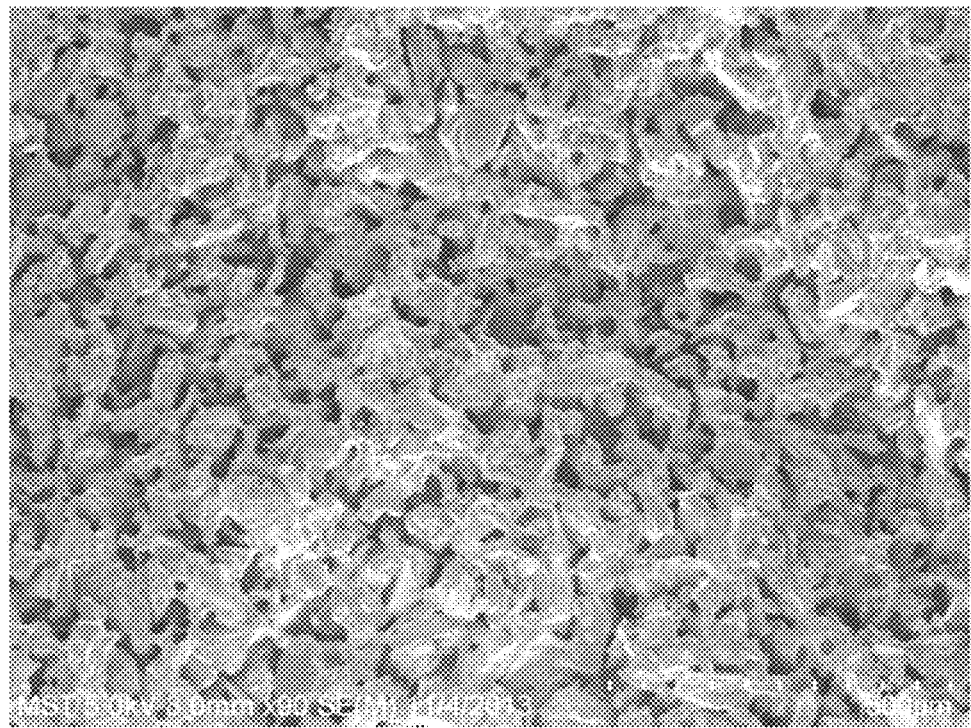

FIG. 3A is the micrograph of the green body obtained from Implementation Case 1.

Implementation Case 2

This implementation case illustrates the preparation method of PVA aqueous solution and its impact on material properties.

First, prepare 1%, 5% and 10% PVA aqueous solutions, respectively. Heat 396 mL, 380 mL and 360 mL of deionized water to 95° C., and then add the weighed 4 g, 20 g and 40 g PVA slowly into the corresponding hot water, respectively. Mechanically stir the solutions while adding PVA into them until all the particles are dissolved. The specific steps of the preparation method of a high-strength SiC porous ceramic are as follows (by the mass ratio): 100 μm SiC powder (80%), 5 μm zirconia powder (5%) and 15 μm activated carbon powder (10%) are added into a ball mill and mechanically mixed for 2 h to get an evenly mixed powder mixture. Pour the same amount of the resulting powder mixture into three mortars, add 5% of the above prepared 1%, 5% and 10% PVA and liquid paraffin into the mortars, respectively, and then stir and mix them thoroughly. Then, the fully mixed powder is placed into a mold at a fixed amount each time and is molded and kept at the pressure for 30~60 s. After mold-release, porous ceramic green bodies can be obtained. The green bodies are dried in an oven at 60-90° C. for 4-6 h. Then, they are placed in a muffle furnace to be sintered. First raise the temperature of the furnace to 200° C. at a rate of 1-2° C./min, then raise the temperature to 500° C. at a rate of 2-3° C./min and keep the temperature at 500° C. for 0.5~1 h, and finally raise the temperature to 1,550° C. at a rate of 3~3.5° C./min and keep the temperature at the point for 2 h. Raising the temperature to 500° C. and then keeping the temperature at 500° C. for 0.5~1 h are to remove the pore-forming agent to get porous ceramic material.

The test results are: SiC porous ceramic material prepared by adding 5% PVA aqueous solution has better performance, having a porosity of 47%, flexural strength 10 MPa, average pore size 8 μm and gas permeation flux 12,000 $m^3/m^2 \cdot h \cdot bar$.

Implementation Case 3

This implementation case illustrates a type of SiC porous ceramic material and its preparation method as well as the performance contrast of different materials prepared with the method with varying conditions.

The specific steps of the preparation method of a high-strength SiC porous ceramic are as follows (by the mass ratio): 100 μm SiC powder (80%), 5 μm zirconia powder (5%) and 15 μm activated carbon powder (10%) are added into a ball mill and ball milled for 2 h, 5 h and 10 h to get an evenly mixed powder mixture, respectively. Pour the three types of resulting powder mixtures into three separate mortars, add 5% PVA aqueous solution and liquid paraffin into the mortars, respectively, and then stir and mix them thoroughly. Then, the fully mixed powder is placed into a mold at a fixed amount each time and is molded and kept at the pressure for 30~60 s. After mold-release, porous ceramic green bodies can be obtained. The green bodies are dried in an oven at 60-90° C. for 4-6 h. Then, they are placed in a muffle furnace to be sintered. First raise the temperature of the furnace to 200° C. at a rate of 1-2° C./min, then raise the temperature to 500° C. at a rate of 2-3° C./min and keep the temperature at 500° C. for 0.5~1 h, and finally raise the temperature to 1,550° C. at a rate of 3~3.5° C./min and keep the temperature at the point for 2 h.

The test results are: The porous ceramic prepared with 10h ball milled powder mixture has a flexural strength of 80 MPa but a porosity of only 34%; and the porous ceramic prepared with 2 h ball milled powder mixture has a flexural strength of 9.7 MPa but a porosity of up to 48%.

Implementation Case 4

This implementation case illustrates a type of SiC porous ceramic material and its preparation method as well as the performance contrast of different materials prepared with the method with varying conditions.

The specific steps of the preparation method of a high-strength SiC porous ceramic are as follows (by the mass ratio): 45 parts of 100 μm SiC powder (80%), 5 μm zirconia powder (5%) and 15 μm activated carbon powder (10%) are added into a ball mill and ball milled for 2 h to get an evenly mixed powder mixture. Pour the resulting powder mixture into a mortar, add 5% PVA aqueous solution and liquid paraffin into the mortar, and then stir and mix them thoroughly. Then, the fully mixed powder is placed into a mold at a fixed amount each time and is molded and kept at the pressure for 30~60 s. After mold-release, porous ceramic green bodies can be obtained. The green bodies are dried in an oven at 60-90° C. for 4-6 h. Then, they are placed in a muffle furnace to be sintered. First raise the temperature of the furnace to 200° C. at a rate of 1-2° C./min, then raise the temperature to 500° C. at a rate of 2-3° C./min and keep the temperature at 500° C. for 0.5~1 h, and finally raise the temperature to 1,450° C., 1,550° C. and 1,650° C. at a rate of 3~3.5° C./min, respectively, and keep the temperature at each of the points for 2 h.

The test results are: When the sintering temperature is 1,550° C., the performance of SiC porous ceramics is the best; when the sintering temperature is lower, the ceramic strength is lower; and when the sintering temperature reaches 1,650° C., cracks occur, resulting in a decrease in strength.

Implementation Case 5

This implementation case illustrates a type of SiC porous ceramic material and its preparation method as well as the performance contrast of different materials prepared with the method with varying conditions.

The specific steps of the preparation method of a high-strength SiC porous ceramic are as follows (by the mass ratio): 45 parts of 100 μm SiC powder (80%), 5 μm zirconia powder (5%) and 15 μm activated carbon powder (10%) are added into a ball mill and ball milled for 2 h to get an evenly mixed powder mixture. Pour the resulting powder mixture into a mortar, add 5% PVA aqueous solution and liquid paraffin into the mortar, and then stir and mix them thoroughly. Then, the fully mixed powder is placed into a mold at a fixed amount each time and is molded and kept at the pressure for 30~60 s. After mold-release, porous ceramic green bodies can be obtained. The green bodies are dried in an oven at 60-90° C. for 4-6 h. Then, they are placed in a muffle furnace to be sintered. First raise the temperature of the furnace to 200° C. at a rate of 1-2° C./min, then raise the temperature to 500° C. at a rate of 2-3° C./min and keep the temperature at 500° C. for 0.5~1 h, and finally raise the temperature to 1550° C. at a rate of 3~3.5° C./min and keep the temperature at the point for 2 h, 4 h and 6 h, respectively.

The test results are: When the temperature-keeping time is 4 h, the performance of SiC porous ceramics is the best; when the temperature-keeping time is shorter, the ceramic strength is lower; but if the temperature-keeping time is too long, a high porosity of the ceramic can't be ensured.

Implementation Case 6

This implementation case illustrates a type of SiC porous ceramic material and its preparation method as well as the performance contrast of different materials prepared with the method with varying conditions.

The specific steps of the preparation method of a high-strength SiC porous ceramic are as follows (by the mass ratio): each of three types (20 μm, 100 μm and 300 μm) of SiC powder (80%), 5 μm zirconia powder (5%) and 15 μm activated carbon powder (10%) are added into a ball mill and ball milled for 2 h to get an evenly mixed powder mixture. Pour the resulting powder mixture into a mortar, add 5% PVA aqueous solution and liquid paraffin into the mortar, and then stir and mix them thoroughly. Then, the fully mixed powder is placed into a mold at a fixed amount each time and is molded at 8 Mpa and kept at the pressure for 30~60 s. After mold-release, porous ceramic green bodies can be obtained. The green bodies are dried in an oven at 60-90° C. for 4-6 h. Then, they are placed in a muffle furnace to be sintered. First raise the temperature of the furnace to 200° C. at a rate of 1-2° C./min, then raise the temperature to 500° C. at a rate of 2-3° C./min and keep the temperature at 500° C. for 0.5~1 h, and finally raise the temperature to 1,550° C. at a rate of 3~3.5° C./min and keep the temperature at the point for 4 h.

The test results are: The smaller the particle size of SiC, the greater the strength of the porous ceramic is after sintering. When the particle size of SiC is 20 μm, the flexural strength of the resulted porous ceramic reaches 77 MPa, but its porosity is only 26% and the pore size is only 8 μm. When the particle size of SiC is 300 μm, because large particles are difficult to sinter, the results show that the strength of the resulted porous ceramic is very low, but it has a high average pore size. With considerations of various factors, it is more appropriate to select 100 μm SiC. When 5% sintering aid zirconia and 10% pore-forming agent activated carbon powder are added into the 100 μm SiC powder and the fully mixed mixture is sintered at 1,550° C. and kept at the temperature for 4 h, the prepared SiC porous ceramic material has a porosity of 47% and a strength of 10 MPa, but its flexural strength is still very low.

Implementation Case 7

This implementation case illustrates a type of SiC porous ceramic material and its preparation method as well as the performance contrast of different materials prepared with the method with varying conditions.

The specific steps of the preparation method of a high-strength SiC porous ceramic are as follows (by the mass ratio): 5 μm zirconia powder (5%-20%) and 15 μm activated carbon powder (10%), SiC whiskers (2%) and 100 μm SiC powder (78-63%) are added into a ball mill and ball milled for 2 h to get an evenly mixed powder mixture. Pour the resulting powder mixture into a mortar, add 5% PVA aqueous solution and liquid paraffin into the mortar, and then stir and mix them thoroughly. Then, the fully mixed powder is placed into a mold at a fixed amount each time and is molded and kept at the pressure for 30~60 s. After mold-release, porous ceramic green bodies can be obtained. The green bodies are dried in an oven at 60-90° C. for 4-6 h. Then, they are placed in a muffle furnace to be sintered. First raise the temperature of the furnace to 200° C. at a rate of 1-2° C./min, then raise the temperature to 500° C. at a rate of 2-3° C./min and keep the temperature at 500° C. for 0.5~1 h, and finally raise the temperature to 1,550° C. at a rate of 3~3.5° C./min and keep the temperature at the point for 4 h.

The test results are: When 100 μm SiC aggregate is selected and 15% sintering aid zirconia, 10% pore-forming agent activated carbon powder, 2% SiC whiskers and 5% PVA aqueous solution & liquid paraffin are added into it and the evenly mixed mixture is sintered at 1,550° C., the resulted porous ceramic material has a porosity of 40.3% and a strength of 38.3 MPa.

Implementation Case 8

This implementation case illustrates a type of SiC porous ceramic material and its preparation method as well as the performance contrast of different materials prepared with the method with varying conditions.

The specific steps of the preparation method of a high-strength SiC porous ceramic are as follows (by the mass ratio): 100 μm SiC powder (78%), each of three types of (1 μm, 3 μm and 5 μm) of zirconia powder (5%), activated carbon powder (10%) and SiC whiskers (2%) are added into a ball mill and ball milled for 2 h to get an evenly mixed powder mixture. Pour the resulting powder mixture into a mortar, add 5% PVA aqueous solution and liquid paraffin into the mortar, and then stir and mix them thoroughly. Pour the resulting powder mixture into a mortar, add 5% PVA aqueous solution and liquid paraffin into the mortar, and then stir and mix them thoroughly. Then, the fully mixed powder is placed into a mold at a fixed amount each time and is molded and kept at the pressure for 30 s. After mold-release, porous ceramic green bodies can be obtained. The green bodies are dried in an oven at 60-90° C. for 4-6 h. Then, they are placed in a muffle furnace to be sintered. First raise the temperature of the furnace to 200° C. at a rate of 1-2° C./min, then raise the temperature to 500° C. at a rate of 2-3° C./min and keep the temperature at 500° C. for 0.5~1 h, and finally raise the temperature to 1,550° C. at a rate of 3~3.5° C./min and keep the temperature at the point for 4 h.

The test result is: After being sintered, the ceramic material added with 5 μm zirconia has better properties.

Implementation Case 9

This implementation case illustrates a type of SiC porous ceramic material and its preparation method as well as the performance contrast of different materials prepared with the method with varying conditions.

The specific steps of the preparation method of a high-strength SiC porous ceramic are as follows (by the mass ratio): 83%~73% SiC powder (100 μm), 5% zirconia powder (5 μm), 5%~15% activated carbon powder (15 μm) and 2% SiC whiskers are added into a ball mill and ball milled for 2 h to get an evenly mixed powder mixture. Pour the resulting powder mixture into a mortar, add 5% PVA aqueous solution and liquid paraffin into the mortar, and then stir and mix them thoroughly. Pour the resulting powder mixture into a mortar, add 5% PVA aqueous solution and liquid paraffin into the mortar, and then stir and mix them thoroughly. Then, the fully mixed powder is placed into a mold at a fixed amount each time and is molded and kept at the pressure for 30 s. After mold-release, porous ceramic green bodies can be obtained. The green bodies are dried in an oven at 60-90° C. for 4-6 h. Then, they are placed in a muffle furnace to be sintered. First raise the temperature of the furnace to 200° C. at a rate of 1-2° C./min, then raise the temperature to 500° C. at a rate of 2-3° C./min and keep the temperature at 500° C. for 0.5~1 h, and finally raise the temperature to 1,550° C. at a rate of 3~3.5° C./min and keep the temperature at the point for 4 h.

The test results are: When 5% sintering aid zirconia, 15% pore-forming agent activated carbon powder, 2% SiC whiskers and 5% PVA aqueous solution & liquid paraffin are added into SiC powder and the evenly mixed mixture is sintered at 1,550° C., the resulted porous ceramic material has a porosity of 55%, a strength of 6 MPa and a pore size of 18 μm. It can be seen that when the pore-forming agent content increases, the flexural strength of the resulted ceramic material decreases by nearly 80% but other properties increase.

Implementation Case 10

This implementation case illustrates a type of SiC porous ceramic material and its preparation method as well as the performance contrast of different materials prepared with the method with varying conditions.

The specific steps of the preparation method of a high-strength SiC porous ceramic are as follows (by the mass ratio): 78% SiC powder (100 μm), 5% zirconia powder (5 μm), 10% activated carbon powder (each of the three types: 8 μm, 20 μm and 50 μm) and 2% SiC whiskers are added into a ball mill and ball milled for 2 h to get an evenly mixed powder mixture. Pour the resulting powder mixture into a mortar, add 5% PVA aqueous solution and liquid paraffin into the mortar, and then stir and mix them thoroughly. Pour the resulting powder mixture into a mortar, add 5% PVA aqueous solution and liquid paraffin into the mortar, and then stir and mix them thoroughly. Then, the fully mixed powder is placed into a mold at a fixed amount each time and is molded and kept at the pressure for 30 s. After mold-release, porous ceramic green bodies can be obtained. The green bodies are dried in an oven at 60-90° C. for 4-6 h. Then, they are placed in a muffle furnace to be sintered. First raise the temperature of the furnace to 200° C. at a rate of 1-2° C./min, then raise the temperature to 500° C. at a rate of 2-3° C./min and keep the temperature at 500° C. for 0.5~1 h, and finally raise the temperature to 1,550° C. at a rate of 3~3.5° C./min and keep the temperature at the point for 4 h.

The test result is: The larger the particle size of the pore-forming agent, the smaller the strength of the porous ceramic material and the larger the pore size of the porous ceramic material.

Implementation Case 11

This implementation case illustrates a type of SiC porous ceramic material and its preparation method as well as the performance contrast of different materials prepared with the method with varying conditions.

The specific steps of the preparation method of a high-strength SiC porous ceramic are as follows (by the mass ratio): 79%~70% SiC powder (100 μm), 5% zirconia powder (5 μm), 10% activated carbon powder (15 μm) and 1%~10% SiC whiskers are added into a ball mill and ball milled for 2 h to get an evenly mixed powder mixture. Pour the resulting powder mixture into a mortar, add 5% PVA aqueous solution and liquid paraffin into the mortar, and then stir and mix them thoroughly. Pour the resulting powder mixture into a mortar, add 5% PVA aqueous solution and liquid paraffin into the mortar, and then stir and mix them thoroughly. Then, the fully mixed powder is placed into a mold at a fixed amount each time and is molded and kept at the pressure for 30 s. After mold-release, porous ceramic green bodies can be obtained. The green bodies are dried in an oven at 60-90° C. for 4-6 h. Then, they are placed in a muffle furnace to be sintered. First raise the temperature of the furnace to 200° C. at a rate of 1° C./min, then raise the temperature to 500° C. at a rate of 2° C./min and keep the temperature at 500° C. for 1 h, and finally raise the temperature to 1,450° C., 1,550° C. and 1,650° C. at a rate of 3°

C./min, respectively, and keep the temperature at the point for 2 h, 4 h and 6 h, respectively.

The test results are: When 5% sintering aid zirconia, 10% pore-forming agent activated carbon powder, 2% SiC whiskers and 5% PVA aqueous solution & liquid paraffin are added into 100 μm SiC powder (78%) and the evenly mixed mixture is sintered at 1,550° C. for 4 h, the resulted porous ceramic material has a porosity of 51%, a strength of 26 MPa, an average pore size of 13 μm and a gas permeation flux 24,000 m$^3$/m$^2$·h·bar. Compared to porous ceramic material without adding whiskers, its porosity increases by 4%, bending strength increases by 2.6 times, pore size increases by 1.5 times and flux increases by 2 times.

FIG. 3B is the micrograph of the whiskers-adding sample after sintering in Implementation Case 11.

FIG. 3C is the micrograph of the whiskers-adding sample after sintering.

Figure 4:
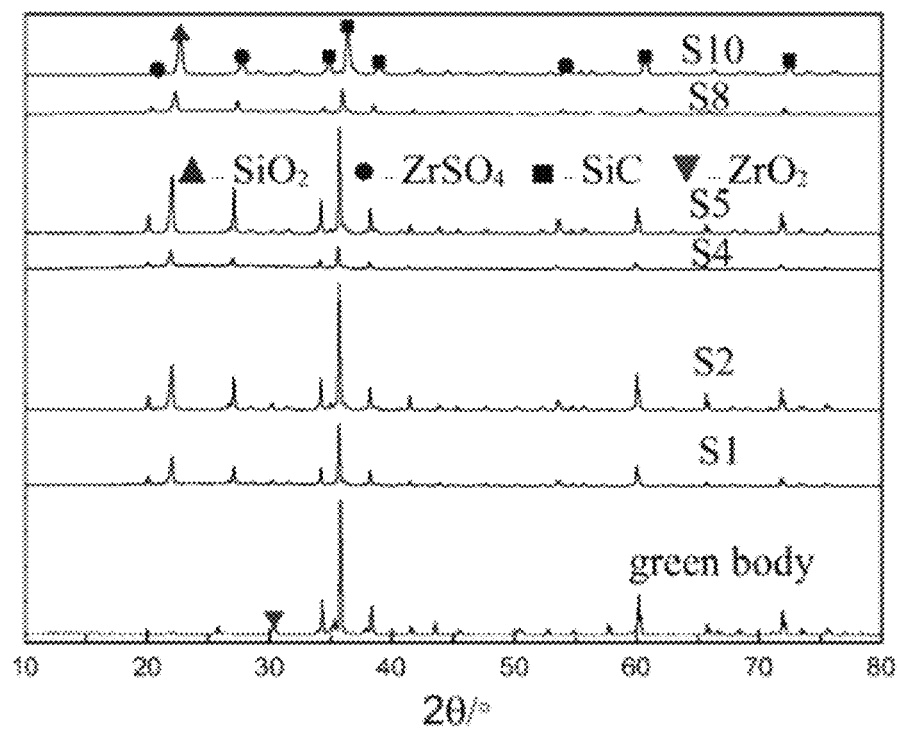
FIG. 4 is XRD spectrum of the sample prepared by adding 3.3% whiskers in Implementation Case 11.

FIG. 4 is the XRD spectrum of the whiskers-adding sample in Implementation Case 11.

Implementation Case 12

This implementation case illustrates the thermal shock resistance of the obtained ceramic material According to the process workflow described in Implementation Case 6, several pieces of bar-like porous SiC ceramic materials were prepared, and then the thermal shock resistance of the materials was investigated by continuously cycled heating and cooling. The concrete steps are: test the thermal shock resistance of the support with the air cooling method; raise the furnace temperature to 800° C., and then place the samples into the electric furnace at one time and keep the furnace temperature at the point for 30 min, and then quickly take them out and place them at room temperature to cool; this is recorded as a thermal shock cycle; after 3 times in a row, take out three samples and measure their flexural strength; after 20 times of doing so, compare the flexural strength changes of the samples before and after the test.

The test results are: Before the test starts, the flexural strength of the samples is 28.7 MPa; after 20 times of such cycled testing, the flexural strength of the samples tends to stabilize and reaches 21.1 MPa, showing their good thermal shock resistance.

Implementation Case 13

This implementation case illustrates the application of the obtained ceramic materials in high-temperature flue gas dust removal. The stability of SiC porous ceramics in the kiln flue gas purification process was studied. The continuous operation time of the pilot test was 30 days. The material used in this experiment is the SiC whiskers-adding material obtained via sintering in Implementation Case 10. It is a single tube having a length of 250 mm, an outer diameter of 50 mm and an inner diameter of 20 mm. It has a pore size of 20 and its porosity and strength are as specified in Implementation Case 10. The inlet temperature of the treated kiln flue gas is 400° C., and the flue gas purification device and process flow are designed according to the actual situation. The membrane component is wound and sealed with graphite and the sealing head is pressed tightly. One end of the membrane tube in the component is sealed. The negative pressure suction method is used to provide the aerodynamic force.

The test results are: The gas permeation flux of the ceramic material decreases gradually as the filtration time increases; after 200 h, the steady-state flux is 200 m$^3$·m$^-$$_2$·h$^{-1}$/bar. The pressure drop on both sides of the membrane increases gradually as the filtration time increases; after 157 h, it reaches the steady state and the steady-state pressure drop is about 40 kPa. In the ceramic surface and pore channels, there is contaminant adsorption, but the surface contamination is more serious than contamination in the pore. When the contaminated ceramic tube is heated at 500° C., the organic pollutants on the surface and in the pore can be removed. Before and after filtration, the crystal composition of the SiC material did not change, but the strength of the ceramic tube decreased from 26.7 MPa to 22.4 MPa, but the overall structure of the tube was intact and still could meet the running demand. In summary, the prepared SiC porous ceramic tube has a promising application in the high-temperature flue gas dust removal field, and its performance can meet the high-temperature harsh application environment.

Figure 5:
FIG. 5 is the flow chart of the SiC porous ceramic material (FIG. 5A) used in Implementation Case 13 and the exhaust gas treatment process of an industrial kiln (FIG. 5B), in which 1 and 6—gate valves; 2—feed-side pressure sensor; 3—permeability-side pressure sensor; 4—thermometer; 5—membrane module; 7—water cycle vacuum pump; 8—oil-water separator; 9—control cabinet; 10—gas flow meter.
Figure 5:
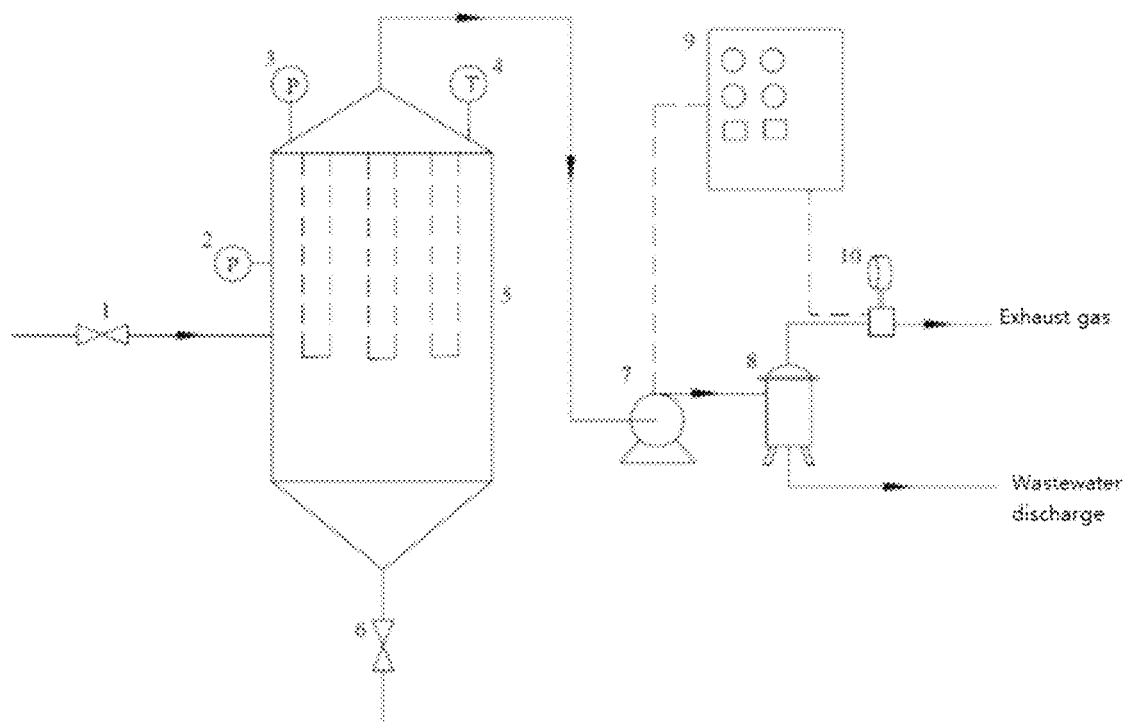

FIG. 5 is the SiC porous ceramic material (5A) used in Implementation Case 13 and the process flow chart (5B) for its application in the industrial kiln flue gas treatment.

We claim:

1. A method for preparing a whisker-reinforced SiC porous ceramic material, comprising
   (1) mixing a SiC aggregate, zirconia, activated carbon and SiC whiskers and then mechanically grinding the resulted mixture to obtain a mixed powder a, wherein said SiC aggregate has an average particle size of 20-300 μm;
   said zirconia, as a sintering aid, has an average particle size of 1-5 μm and a purity of more than 99%;
   SiC whiskers, as a reinforcing agent, have a crystal form of β and L/D>20, with L as a length of a SiC whisker and D as a diameter of the SiC whisker;
   said activated carbon, as a pore-forming agent, has a particle size of 8-50 μm;
   (2) adding polyvinyl alcohol (PVA), configured to be a binding agent, and liquid paraffin, configured to be a mold release agent, into the mixed powder a and mixing them evenly, and then making the mixture of PVA, liquid paraffin and mixed powder into a first SiC porous ceramic green body through a dry pressing or extrusion method, and then drying the first green body in an oven to get green body b;
   (3) placing green body b in a furnace to sinter, then after natural cooling, to obtain the whisker-reinforced SiC porous ceramic material,
   wherein mass ratios between a raw material to a total weight of all the raw materials including SiC aggregate, zirconia, SiC whiskers, activated carbon, and PVA, are defined:
   zirconia is at 5-20 w %,
   SiC whiskers are at 1-10 w %,
   activated carbon is at 5-15 w %,
   PVA is at 5 w %, and
   the remaining weight is SiC aggregate.

2. The method described in claim 1 is characterized in that grinding time in step (1) is 2-10 h.

3. The method described in claim 1 is characterized in that drying temperature in step (2) is 60 to 90° C. and drying time is 2 to 4 hours.

4. The method described in claim 1 is characterized in that the sintering process mentioned in step (3) comprises the following steps:
   a) increasing temperature of the furnace to 200° C. at a rate of 1-2° C./min;

b) then raising the temperature to 500° C. at a rate of 2-3° C./min;
c) keeping the temperature at 500° C. for 0.5-1 h to remove the activated carbon;
d) raising the temperature to 1,450-1,650° C. at a rate of 3-3.5° C./min and keeping the temperature at 1,450-1,650° C. for 2-6 h;
wherein steps occur sequentially from a)-d).

5. The method described in claim 1 is characterized in that a shape of said first green body is selected from plate, tube and honeycomb.

6. A method
of making a porous ceramic membrane, comprising
preparing a whisker-reinforced SiC porous ceramic material by the method of claim 1; and
using the prepared whisker-reinforced SiC porous ceramic material to make the porous ceramic membrane.

\* \* \* \* \*